United States Patent
Bass et al.

(10) Patent No.: US 6,744,446 B1
(45) Date of Patent: Jun. 1, 2004

(54) DISPLAY OF A HIEARCHICAL TELECOMMUNICATION NETWORK

(75) Inventors: Neil Rounce Bass, Dursley (GB); Graham John Davies, Avening (GB); Gregory James Helbert, Chippenham (GB)

(73) Assignee: Lucent Technologies Inc., Murray Hill, NJ (US)

(*) Notice: Subject to any disclaimer, the term of this patent is extended or adjusted under 35 U.S.C. 154(b) by 394 days.

(21) Appl. No.: 09/625,684

(22) Filed: Jul. 26, 2000

(30) Foreign Application Priority Data

Jul. 27, 1999 (EP) .............................. 99305946

(51) Int. Cl.⁷ ........................ G09G 5/00; G06F 15/173
(52) U.S. Cl. ...................... 345/734; 345/969; 345/753; 345/853; 709/223
(58) Field of Search .................. 345/735, 736, 345/737, 742, 853, 855, 969, 645, 734; 725/147; 381/71.11; 709/223, 224

(56) References Cited

U.S. PATENT DOCUMENTS

| | | | | |
|---|---|---|---|---|
| 5,276,789 A | * | 1/1994 | Besaw et al. | 395/140 |
| 5,295,244 A | * | 3/1994 | Dev et al. | 395/161 |
| 5,471,399 A | * | 11/1995 | Tanaka et al. | 364/491 |
| 6,058,103 A | * | 5/2000 | Henderson et al. | 370/254 |
| 6,477,566 B1 | * | 11/2002 | Davis et al. | 709/223 |

OTHER PUBLICATIONS

Lee, R.E., et al "Reife Fur Die Insel British Telecommunication (BT) Startete Erstes Integriertes SDH/TMB–NETZ Der Welt MIT GPT/Siemens—Komponenten" "Telcom Report, de Siemens" AG. Munchen, vol. 17 No. 5, p. 194–197 Sep. 17, 1994.

Harada, K., et al "SDH Network Equipment Architecture Controlled By Multi Operation Systems", "Proceedings of the Global Telecommunications Conference, New York" p. 1162–1165 Nov. 28, 1994.

Gruber, J.G. "Performance and Fault Management Functions for the Maintenance of Sonet/SDH and ATM Transport Networks" "Proceedings of the International Conference On Communications, New York" p. 1308–1314 May 23, 1993.

European Search Report, dated Jan. 28, 2000.

Linda Chang et al., "A Network Status Monitoring System Using Personal Computer", *IEEE Global Telecommunications Conference & Exhibition*, Dallas, Texas, Nov. 27–30, 1989, vol. 1, pp 201–206.

* cited by examiner

*Primary Examiner*—John Cabeca
*Assistant Examiner*—Namitha Pillai
(74) *Attorney, Agent, or Firm*—C.M.K. Watts; Gregory J. Murgia

(57) ABSTRACT

A method and apparatus are provided for displaying network information to a user connected to a network or sub-network manager of a hierarchical telecommunications network by providing a map on a visual display unit showing network elements and connections between network elements. A plurality of views may be selected which include not only a conventional physical view, in which all network elements and the optical fibre links between them are shown, but also one or more views showing connections at respective virtual container levels (e.g. VC-4, VC-12). In these views only the multiplexers are shown and virtual containers at the respective level are shown as lines joining the multiplexers which are their termination points.

8 Claims, 3 Drawing Sheets

DISPLAY OF A HIERARCHICAL TELECOMMUNICATION NETWORK

CROSS-REFERENCE TO RELATED APPLICATION

This application claims priority of European Patent Application No. 99305946.8, which was filed on Jul. 27, 1999.

TECHNICAL FIELD

This invention relates to methods and apparatus for displaying information to a user connected to a network or sub-network manager of a hierarchical telecommunications network such as are described in the Synchronous Digital Hierarchy (SDH) or Synchronous Optical Network (SONET) standards.

BACKGROUND OF THE INVENTION

In a SDH or SONET network, the nodes of the network contain all the necessary functionality to route messages through the network. The network or sub-network manager supervises the operation of the network, or that part of the network which is within its management domain. One or more users are connected to the manager and have terminals which provide a view of the network, with its nodes (multiplexers) and regenerators indicated by distinctive symbols and connections between them indicated by lines. When alarms are raised, the origins of the alarms are indicated on the network view by means of a suitable colour or attribute applied to the respective symbol.

As well as providing the user with a view of the network and any alarms raised from it, the view also provides a visual interface, so that the user can select, by means of a device such as a mouse, links to configure or reconfigure.

In a SDH network, data are carried in what are called "virtual containers". The highest level of virtual container is denoted VC-4 and it can carry data at 150.336 Mbit/s. However, it can be configured to carry a number of lower level virtual containers, for example 63 VC-12 virtual containers, each of which can carry data at 2.304 Mbit/s. Typically, a VC-4 virtual container carries data from one node to another node to which it is directly connected, meaning that there are no intervening nodes, though there may be some regenerators, whereas a VC-12 virtual container typically carries data from one node to another, separated by many intermediate nodes. Thus, a VC-12, or other lower level virtual container, acts like a semi-permanent connection between a first node and a second node which is not physically directly connected to the first node; data are put into the virtual container at the first node and not unpacked until they arrive at the second, even though they may pass through several nodes on the way. Part of the function of the user at network or sub-network management level is to configure the virtual containers to provide the required semi-permanent connections and to monitor the proper functioning of the network in providing them. As such, it would be desirable to display information to facilitate such functions.

Although it is the SDH standard which is particularly described in this application, SONET networks have structures which are similar in concept, though the terminology and the exact data rates are different.

SUMMARY OF THE INVENTION

According to the principles of the invention, an improved visual interface is provided for a user at network or sub-network management level in a hierarchical network such as a SDH or SONET network. In one illustrative embodiment, the user can view the network, not only on the physical level, as is customary, but also on any of a number of virtual container levels. Thus, in an illustrative example, it is possible to view the structure of a SDH network at the VC-4 level and at the VC-12 level, as well as the physical level, and to switch between the three views. Also, where applicable, it is possible to select VC links at one level, in order to configure them, for example, to set up virtual containers of a lower level within them.

DETAILED DESCRIPTION

Figure 1:
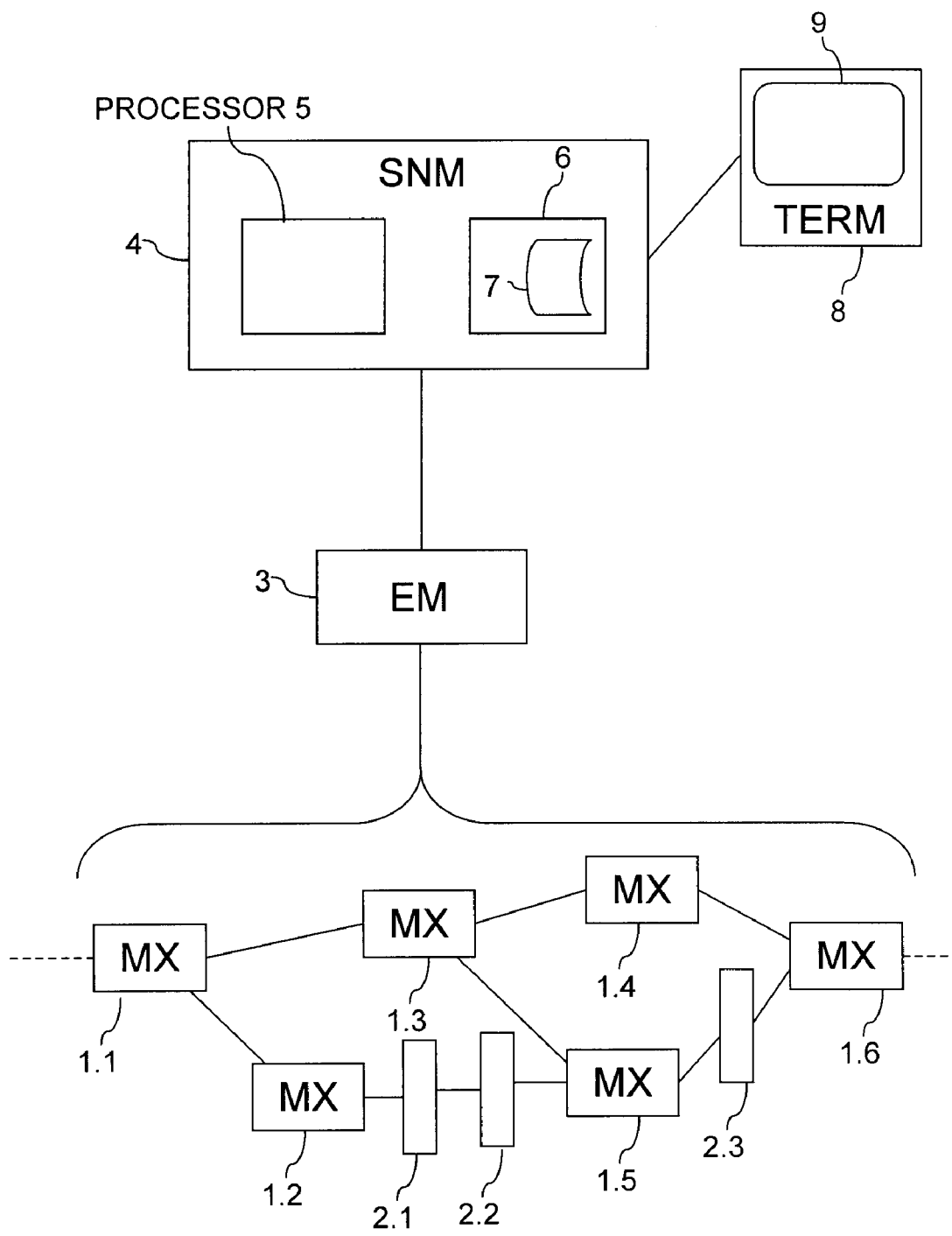
FIG. 1 shows, in diagrammatic form, a sub-network of the SDH type.

FIG. 1 shows a SDH sub-network, comprising a number of multiplexers (MX) 1.1–1.6 and regenerators 2.1–2.3 connected by optical fibre links. The network elements (multiplexers and regenerators) contain all the necessary functionality to route messages through the network, but they do not have any information on the topology of the network, so they have to rely on higher levels of control to configure them so that they route the signals to the correct downstream elements. The multiplexers 1.1–1.6 are the locations at which virtual containers can be added and dropped, i.e. they are the nodes of the network and can be end points for virtual containers; the regenerators 2.1–2.3 are not involved in signal routing, but maintain the clarity and strength of the signal over long links.

The network elements 1.1–1.6, 2.1–2.3 are controlled and monitored by an element manager 3 which deals with the network elements as individual units. That is to say, it does not have information on the network topology, but it does have information on the individual network elements—what type of equipment they contain and what exchanges of signals are necessary to reconfigure them. Although only a few network elements are shown connected to the element manager 3, in a typical network there might be of the order of two hundred network elements controlled by one element manager.

The connecting links between the network elements may comprise optical fibre links which may each carry of the order of 16, each of which can be configured to carry up to 63 VC-12 virtual containers.

The element manager 3 is connected to a sub-network manager 4 which controls the section of the network in its domain as a set of links forming end-to-end connections. To do this, it needs to have information on the topology of the part of the network in its domain, and in particular, the assignment of VC-4 virtual containers to optical fibre links and of VC-12 virtual containers to VC-4 virtual containers, and the end points of the virtual containers. The sub-network manager 4 is essentially and computer and contains a processor 5 and a memory 6 which includes a table section 7 containing information on the topology of the network, the assignment of virtual containers and the end points of the virtual containers.

Attached to the sub-network manager 4 are one or more terminals 8, each including a display screen 9 and conventional means, such as a keyboard and mouse (not shown) to enable a user to configure the network by assigning virtual containers and setting endpoints. Alarms raised by network elements are also passed to the sub-network manager and displayed on the display screen 9 of the terminal 8 so that the user at the terminal can carry out any necessary reconfiguration to work round any faults that may have occurred in the network.

Figure 2A:
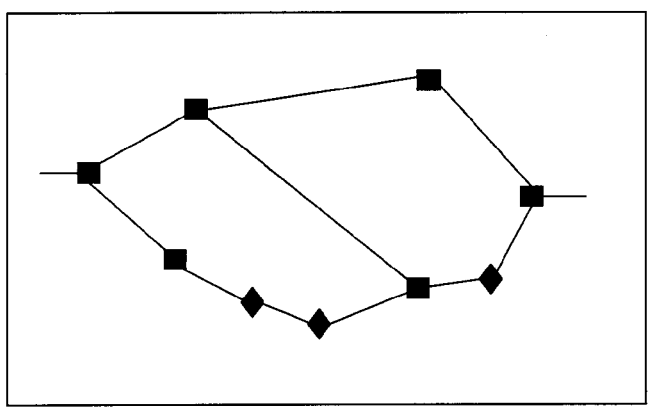
FIGS. 2A–C show views of the sub-network of FIG. I at various levels.

FIG. 2A shows the conventional view of the network which is given on the screen 9 of FIG. 1. This shows all of the network elements and the physical links between them. The network elements are shown as symbols. In the illustration multiplexers are shown as filled rectangles, the regenerators as lozenges and the links as straight lines joining the network elements. This view shows the physical topology of the network. Conventionally, this is the only view of the network which is provided, but according to the present invention it is one of several views, and will be referred to as the "physical view".

Figure 2B:
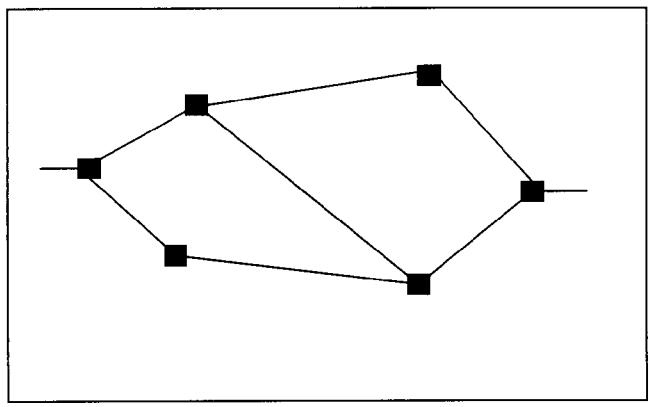

FIG. 2B shows a view of the network showing the multiplexers and the VC-4 links. This view will be referred to as the "VC-4 view". The regenerators do not appear in this view, because they are transparent to the virtual containers. The lines in this view do not necessarily correspond to physical links, but to VC-4 virtual containers, and the fact that two multiplexers are shown joined by a line means that there is at least one VC-4 virtual container having those multiplexers as termination points. As shown in FIG. 2B the VC-4 virtual containers connect only multiplexers that are joined directly or via one or more regenerators. This will often be the case. However, it is also possible that one or more VC-4 virtual containers may have termination points that are only connected via one or more other multiplexers, in which case there would be extra lines joining those termination points.

Figure 2C:
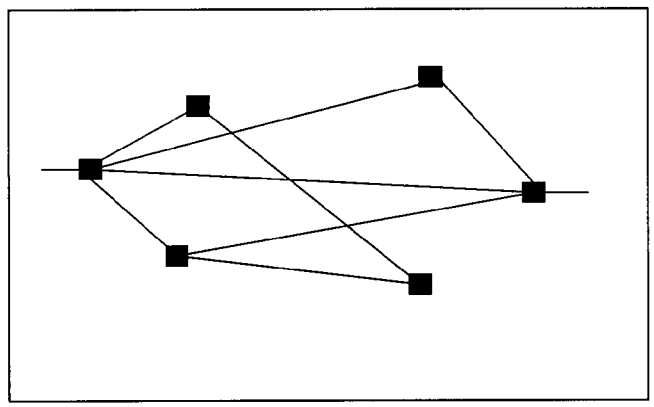

FIG. 2C shows a view of the network showing the multiplexers and the VC-12 links. This view will be referred to as the "VC-12 view". In this view, multiplexers that are directly connected physically, as shown in FIG. 2A, and are connected by VC-4 virtual containers, as shown in FIG. 2B, are not necessarily shown connected, since there may be no VC-12 virtual containers having those multiplexers as termination points. On the other hand, since VC-12 virtual containers can link multiplexers right across the network, there are extra lines joining the termination points of those virtual containers.

The positions of the multiplexers in the three views shown in FIGS. 2A, 2B and 2C, namely the physical view, the VC-4 view and the VC-12 view, are the same, so that it is easy for a user to identify the multiplexers in the different views.

Figure 3:
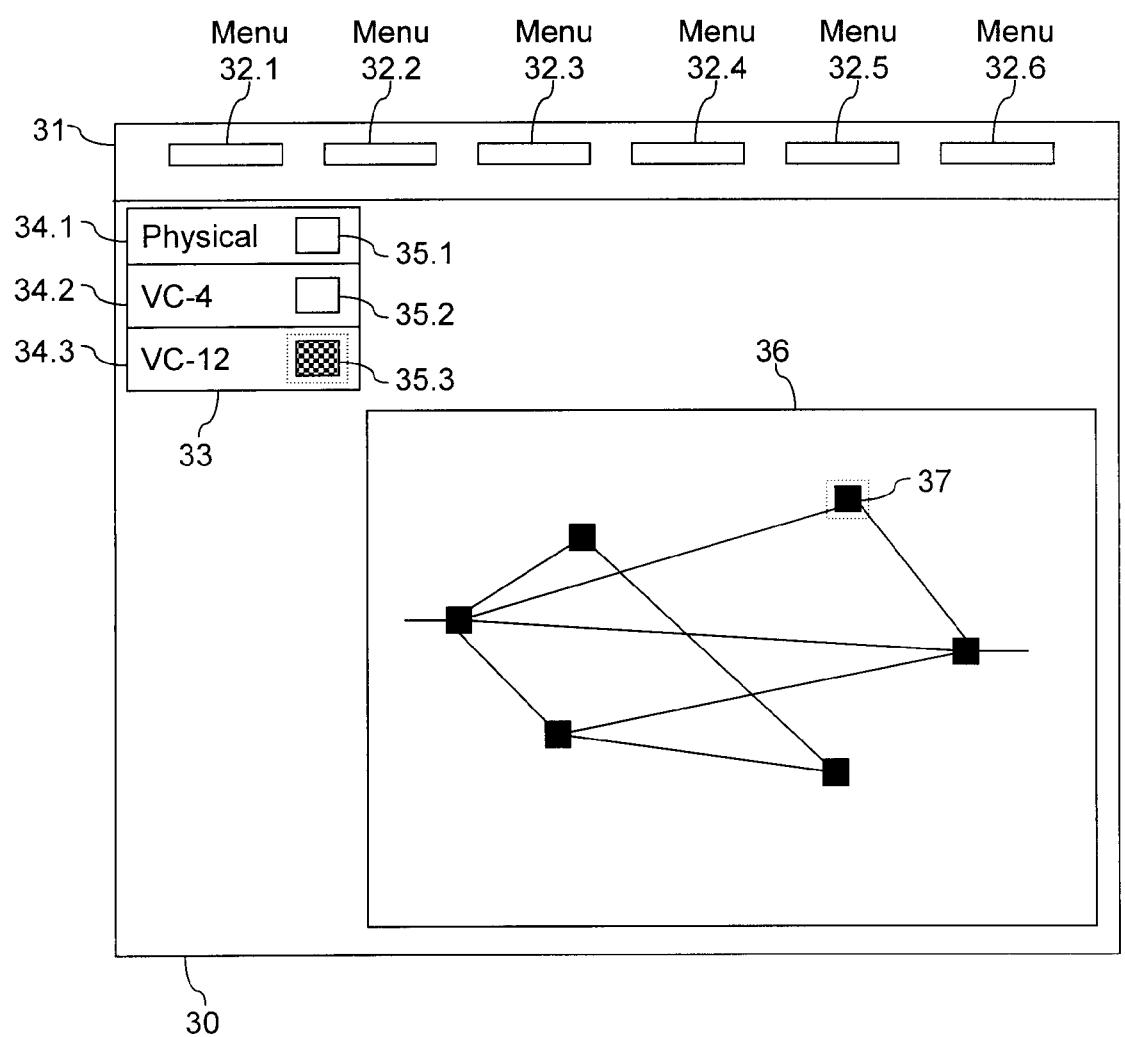
FIG. 3 illustrates a screen display as provided according to the principles of the invention.

FIG. 3 shows a screen display 30 such as is provided on the screen 9 of terminal 8 of FIG. 1. At the top of the display 30 there is a conventional menu bar 31 containing menus 32.1–32.6. Below the menu bar there is a selection area 33 which provides means for selecting one of the views. At the top of the selection area is an area 34.1 corresponding to the physical view, and containing a mouse-clickable region 35.1 for selecting the physical view. Next below that area, there is an area 34.2 corresponding to the VC-4 view and containing a mouse-clickable region 35.2 for selecting the VC-4 view. Below that area, at the bottom of the selection area 33, there is an area 34.3 corresponding to the VC-12 view, and containing a mouse-clickable region 35.3 for selecting the VC-12 view. Below and to the right of the selection area 33 there is a map display area 36 for displaying any selected one of the views of the network. As shown in FIG. 3 the VC-12 view is selected, as signified by the mouse clickable region 35.3 in the area 34.3 corresponding to the VC-12 view being shown shaded, so the view displayed in the map display area 36 is the VC-12 view as shown in FIG. 2C.

Since the various views are displayed in the same area 36, and the positions of the symbols corresponding to the multiplexers in the various views are the same, the positions of these symbols will not change as different views are selected, and the effect will be of a constant and unmoving array of multiplexer symbols connected by changing links.

The display provides, not only a way of visualising the network at various levels of abstraction, but also a way of gaining access to the various virtual containers. Thus, if a user wishes to gain access to a particular virtual container, to change its termination points, or to reconfigure it in some other way, he or she can select the appropriate view containing that virtual container and then select the virtual container by clicking with a mouse on the line corresponding to it. Of course, there may be, and frequently will be, more than one virtual container of a given level connecting the same two termination points, so clicking on a line in the display will select several virtual containers, and the user will have to select the particular one by means of a menu.

Since alarms raised on a hierarchical network are generally raised at a particular level, i.e. they relate to the physical level or the VC-4 or the VC-12 level, and they identify themselves as such, they can readily be displayed on the appropriate view of the network. Thus, in the display shown in FIG. 3, the mouse-clickable region 35.3, corresponding to the VC-12 view, is flashing, as shown in the Figure by a dotted surround, and the symbol corresponding to the termination point 37 originating the alarm is also flashing. Thus, the user is made aware of the alarm, and to some extent also of the nature of the alarm, before he has started to examine it in detail.

The method according to the invention may be implemented by means of a computer program loaded into the memory 6 of the sub-network manager 4 of FIG. 1, for performing the steps of the method when the program is run on the processor 5 of the sub-network manager. Such a computer program may be stored on a computer usable medium and comprise computer readable program means for causing the processor 5 to carry out the steps of the method.

Although the description has been in terms of a SDH network having two levels of virtual container, it will be apparent to a person skilled in the art that the invention will also be applicable to SDH networks having more than two levels of virtual container, in which case views may be provided at each level, and to other types of hierarchical network, such as SONET networks.

What is claimed is:

1. A method of displaying information to a user connected to a network or sub-network manager of a hierarchical telecommunications network, comprising providing a map on a visual display unit showing network elements and connections between network elements, the method further comprising:

providing a plurality of views; and
selecting a desired one from said plurality of views;
said plurality of views comprising a physical view comprising multiplexers, regenerators and physical links and a plurality of views showing connections at respective virtual container levels and each comprising multiplexers and virtual containers at the respective level having ones of said multiplexers as termination points;

wherein the positions of the multiplexers are the same in each of the views.

2. A method according to claim 1, wherein said map provides a means of selecting a desired one of said network elements or connections.

3. A method according to claim 2, including displaying alarms raised at a particular level in the network on the view corresponding to that level.

4. A method according to claim 3, wherein the network is a Synchronous Digital Hierarchy network or a Synchronous Optical Network.

5. A method according to claim 4, wherein the virtual container levels include VC-4 and VC-12 container levels.

6. Apparatus for displaying information to a user connected to a network or sub-network manager of a hierarchical telecommunications network comprising:

means for providing a plurality of views; and means for selecting a desired one from said plurality of views; and wherein said plurality of views include a physical view comprising multiplexers, regenerators and physical links and a plurality of views showing connections at respective virtual container levels and each comprising multiplexers and virtual containers at the respective level having ones of said multiplexers as termination points;

wherein the positions of the multiplexers are the same in each of the views.

7. A computer program product directly loadable into the internal memory of a network or sub-network manager of a hierarchical telecommunications network, comprising software code portions for performing, when said product is run on said network or sub-network manager, the steps of:

providing a plurality of views; and selecting a desired one from said plurality of views;

said plurality of views comprising a physical view comprising multiplexers, regenerators and physical links and a plurality of views showing connections at respective virtual container levels and each comprising multiplexers and virtual containers at the respective level having ones of said multiplexers as termination points;

wherein the positions of the multiplexers are the same in each of the views.

8. A computer program product stored on a computer usable medium, comprising computer readable program means for causing a network or sub-network manager of a hierarchical telecommunications network to perform the steps of:

providing a plurality of views; and selecting a desired one from said plurality of views;

said plurality of views comprising a physical view comprising multiplexers, regenerators and physical links and a plurality of views showing connections at respective virtual container levels and each comprising multiplexers and virtual containers at the respective level having ones of said multiplexers as termination points;

wherein the positions of the multiplexers are the same in each of the views.

* * * * *